Figures 1, 2:
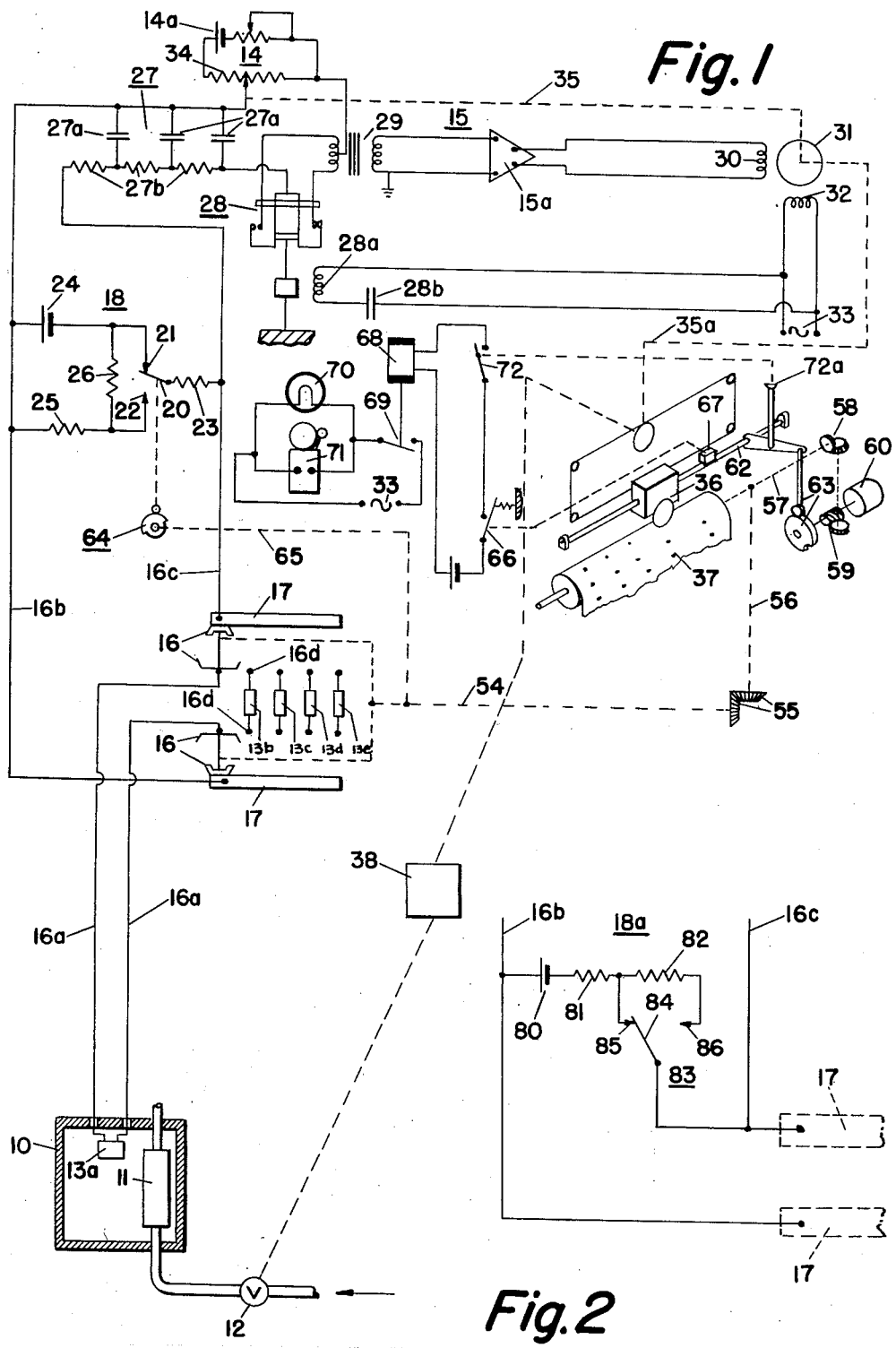

Oct. 1, 1957  D. VANDEVENTER  2,808,549
FAIL-SAFE ARRANGEMENT FOR MULTIPLE-POINT RECORDERS
Filed Feb. 27, 1956

United States Patent Office 2,808,549
Patented Oct. 1, 1957

2,808,549

FAIL-SAFE ARRANGEMENT FOR MULTIPLE-POINT RECORDERS

David Vandeventer, Philadelphia, Pa., assignor to Leeds and Northrup Company, Philadelphia, Pa., a corporation of Pennsylvania Application February 27, 1956, Serial No. 568,106

9 Claims. (Cl. 318—28)

This invention relates to systems for measuring and/or controlling the magnitude of a condition, and more particularly to an arrangement for indicating faults in measuring circuits including condition-responsive elements and associated circuitry.

In measuring and controlling systems, the occurrence of a fault such as a discontinuity in the measuring circuit will cause the system to become erratic in operation and may result in the loss of control of the magnitude of the condition. Accordingly, such systems generally have included a device or arrangement of some kind to indicate the presence of the fault and also to asure operation of the final control element to a position considered safe from the standpoint of the process under control. Such arrangements have been termed "fail-safe systems."

Many fail-safe systems of the prior art include a circuit in shunt with a condition-responsive element such as a thermocouple. The shunt circuit generally includes a high-valued resistor in series with a voltage source such as a dry cell. By making the resistance of the fail-safe circuit quite high as compared to the resistance of the thermocouple or measuring circuit, the fail-safe provision introduces some offset but of a very low order of magnitude. While such an arrangement has been found satisfactory with measuring circuits including condition-responsive devices having resistances of a low order, for example up to about 120 ohms, where the condition-responsive device is of the high impedance type, for example up to 4,000 ohms and above, the conventional fail-safe systems are no longer adequate. If a low order of offset or error signal is to be maintained the value of the resistance in the fail-safe circuit must be greatly increased. This introduces delayed response by the measuring system for the reason that the detectors used in general include capacity-type filter networks. Thus, for a particular system, when the resistance of the condition-responsive element is increased from 120 ohms to 4,000 ohms and the resistance of the fail-safe circuit is also increased to reduce offset the response time will be increased from about two seconds to about sixty seconds or more.

The foregoing problem is of even greater consequence for multiple-point recorders where measurements of a plurality of conditions take place in sequence; and where each such measurement is completed in a few seconds. Thus, in order to protect the system upon failure of any of the multiple-point measuring circuits, the fail-safe action must take place during an interval less than the total measuring time for each condition. Reducing the resistance of the fail-safe circuit will increase the speed of response. At the same time the resultant higher voltage will increase the offset error. For a system of the type under discussion, with the measuring circuit having an impedance of approximately 4,000 ohms, the offset may be as great as 5% for a fail-safe circuit which completes its operation in less than four seconds.

Accordingly, it is an object of the present invention to provide a fail-safe system which operates at high speed and yet affects to a negligible degree the accuracy of the measurement of the magnitude of the condition.

It is a further object of the present invention to provide a fail-safe network which functions to protect each of a plurality of measuring circuits, and which operates at a speed to assure completion of the fail-safe action during a time interval materially less than that required for the measurement of each of the plurality of conditions.

In carrying out the invention in one form thereof, a fail-safe circuit including a source of voltage is effectively made a part of each measuring circuit during a substantial part of the time required for measuring the magnitude of each condition. The system is characterized by effectively reducing or disconnecting from the measuring circuit the bias or fail-safe voltage during the terminal portion of the measuring cycle. Acccordingly, there is made effective a high-speed fail-safe system which does not materially affect the measurement of the magnitude of the condition.

In one form of the invention the fail-safe circuit includes a voltage divider connected across a source of voltage with associated switching means operated in synchronism with the multiple-point recorder for applying a fail-safe bias voltage to each measuring circuit during an initial portion of each measuring interval. During the terminal portion of each measuring cycle, the fail-safe bias voltage is reduced to a relatively low value, yet sufficient to maintain the final control element in a fail-safe position in the event of earlier detection of a measuring-circuit failure during the initial portion of the measurement cycle.

For further objects and advantages of the present invention, reference may be had to the following detailed description taken in conjunction with the accompanying drawing in which:

Fig. 1 schematically illustrates a multipoint recording system embodying the present invention; and Fig. 2 illustrates a modification of the present invention.

While the high resistance or impedance of each measuring circuit may be due to long lead lines, or other requirements of particular systems, the description of the present invention will be simplified by assuming that each of a plurality of condition-responsive devices or transducers 13a–13e are of the high impedance type, for example thermistors.

In studies of the operation of combustion equipment, whether of boilers, internal combustion engines or the more recently developed reactors and jet engines, it is frequently desirable to measure in succession various conditions, such as the temperatures developed at a plurality of locations. Thus, in Fig. 1 the condition-responsive element 13a has been illustrated as being located in a position within an enclosure 10 to which heat is either added or taken away by a heat exchanger 11. The condition-responsive element 13a is illustrated as connected in a measuring circuit which extends by way of conductors 16a to the contacts of a multipoint switch, the movable contacts 16 of which are illustrated in the first position and in engagement with fixed contacts 17. Thus, element 13a is in the measuring circuit which is connected by way of conductors 16b and 16c to the input filter 27 of the detector-amplifier 15. The self-balancing measuring system is illustrated as of the type disclosed in Williams Patent No. 2,657,349. For additional information on multipoint recorders in general, reference may be had to Stein et al. Patent No. 2,549,401.

In order to detect a fault which may occur in any one of the transducers 13a–13e or in the measuring circuits of which they form a part, there is provided a fail-safe circuit or network 18 connected across the input conductors 16b and 16c of the detector-amplifier measuring network. The network 18 develops a voltage or potential difference across the input circuit of sufficient magnitude to produce a fail-safe action upon the occurrence of a fault such as the opening of the measuring circuit. With the completion of the measuring cycle for each condition-responsive element in a time interval of the order of four seconds, the fail-safe action is preferably completed in a lesser time, for example, in a time interval of the order of two seconds.

The voltage introduced by the fail-safe network gives rise to an offset error, that is a displacement of the final measuring element such as the printwheel of the printing device 36 associated with the recorder chart 37 from a position indicative of the magnitude of the condition under measurement. By the inclusion of a circuit-changing means such as a switch 20 in the fail-safe network in cooperative relation with a voltage divider comprising resistors 25 and 26, the offset error is effectively eliminated by substantially reducing the fail-safe voltage during the terminal portion of each measuring cycle. The result is that the printwheel assembly 36 will be driven by the motor 31 of the recorder to a final position indicative of the magnitude of the condition and in the absence of offset of any consequential magnitude. The printwheel is actuated to the final position accurately to record on the chart 37 the magnitude of the condition under measurement.

From the foregoing, it will be seen that fail-safe network 18 may be considered as forming two sources of electromotive force or voltage of differing magnitude. With switch 20 in the illustrated position to complete a circuit through contact 21, the higher-voltage source is applied during the initial portion of each measuring cycle. However, when the switch 20 is actuated to transfer the circuit to the lower contact 22, a voltage of lesser value is connected across measuring circuit 16b, 16c. As shown, the dry cell 24 in conjunction with the voltage divider 25, 26 develops the voltages of differing value which are in succession applied to the measuring circuit. The resistor 23 included in series with the voltages selected from the fail-safe network has a relatively high value compared with the resistance of each measuring circuit including the condition-responsive elements thereof. Nevertheless, its resistance is not so high as to materially increase the time of response.

There will now be described the operation of the invention as a whole as applied to the multipoint recording and controlling system.

Upon change in the magnitude of the condition under measurement, the potential difference applied to the measuring circuit by the condition-responsive element or transducer 13a changes. That change of potential is applied by way of a filter 27 and a vibrator 28 to the primary winding of an input transformer 29. The vibrator 28 converts the direct-current potential difference to alternating-current which is then amplified by an amplifier 15a and applied to the control winding 30 of an alternating-current motor 31. The power winding 32 and the operating coil 28a of the vibrator are both energized from the same source of alternating current 33. A condenser 28b is shown included in circuit with coil 28a and is used for phase adjustment. The vibrator 28 is the synchronous type for producing 60 cycle alternating current for energization of the control winding 30. Thus, upon a change in the potential difference in the measuring circuit, the motor 31 is energized for rotation in a direction dependent upon the direction of change of the condition under measurement.

A final control element such as a valve 12 may be positioned by direct drive from the motor 31 or additional control provisions 38 may be provided such as shown in Davis Patents 2,300,537 and 2,666,170.

The motor through the mechanical connection 35 also adjusts the movable contact associated with resistor 34 of a potentiometer 14 including its own source of supply as represented by a battery 14a. The adjustment is in the direction to reduce to zero the input signal to the amplifier 15a. Through the mechanical connection 35a the printwheel assembly 36 is moved along the chart 37 and indicates the direction and extent of change of the magnitude of the condition under measurement. During the initial part of the measuring cycle the printwheel assembly 36 has a position offset with respect to the true magnitude of the condition under measurement. As the terminal portion of the measuring cycle is approached, the offset is greatly reduced by actuation of the switch 20 to reduce the fail-safe voltage. The operation of switch 20 is accomplished by the rotation of a cam 64 driven in timed relation with the measuring instrument. As shown, the synchronous motor 60 serves not only to drive the chart 37 by way of gears 58, 59 and shaft 57, but also, through mechanical connection 56, gears 55 and mechanical connections 54 and 65, rotates the switch operating cam 64. The cam 64 is illustrated as completing one revolution during each measuring cycle. Thus, during an initial measuring period, for example, the first two seconds, the circuit controlling means including the switch 20 remains in its uppermost position and during the latter part of that period, the final two seconds, it is in its lowermost position. If a fault occurs during the initial part of the measuring cycle as by a discontinuity in the condition-responsive element 13a or in its associated circuit a relatively high voltage appears across the circuit 16b, 16c from the fail-safe network 18 and is effective to apply a relatively high potential difference to the amplifier 15a. The amplifier energizes the motor 31 in a direction to close the valve 12 which can be assumed as regulating the supply of a heating medium to the heat exchanger 11. If that operation occurs, the subsequent operation of the cam 64 and of the switch 20 to reduce the offset voltage will not cause reversal of the motor 31 since the reduced voltage will still be of adequate magnitude to maintain the valve 12 in its closed position.

As the valve 12 is moved to its closed position, the printwheel and associated mechanism 36 is moved to an extreme position of the chart 37, i. e., to the high-end of the scale. As that movement is completed, the mechanism 36 engages an arm 67 to close a normally open switch 66, partially to close an energizing circuit for the actuating coil 68 of a relay 69. At the end of the measuring cycle, a cam and lever assembly 63 operates the printwheel against the chart 37 and through a mechanical connection 72a closes a switch 72 to complete the energizing circuit for the coil 68 of relay 69. The relay 69 is energized to close a circuit from the source of supply 33, to energize a signal light 70 and/or an audible signaling means shown as a buzzer 71. If desired, the relay 69 may be provided with a holding circuit for its operating coil 68 to maintain the signaling means effective until an operator has deenergized the relay after being apprised of the fault condition. Even though the recorder moves to successive points, the fault condition will be readily known by reason of the operation of the printwheel at the high-end of the scale, which if desired, may be beyond the upper end of its chart or scale position to provide even greater certainty as to the presence of the fault condition. For more details with respect to the operation of the printwheel, reference may be had to Ross Patent No. 2,113,748.

If a failure has not occurred during the intial portion of the measuring cycle, then upon reduction of the fail-safe voltage, the offset is correspondingly reduced to a low order of magnitude and the motor 31 moves the printwheel assembly 36 to a position closely approximating on the scale the magnitude of the condition under measurement. As soon as the printwheel records the magnitude of the condition the motor 60, through the driving connection 54, moves the selector switch, elements 16 thereof, to their second position. They disconnect the condition-responsive element 13a from the measuring circuit and connect into the measuring circuit the condition-responsive element 13b by way of contacts 16d. The system operates successively to record the magnitudes of each of a multiplicity of conditions with the fail-safe system effective during all measuring cycles with respect to each of the conditions under measurement.

The following specific embodiment of the present invention is intended as exemplary only and not by way of limitation. It was applied to a continuous balance measuring system having an input impedance at the detector-amplifier 15 of 7,500 ohms and a 20 millivolt range for the resistor or slidewire 34. Each measuring circuit including conductors 16a, 16a and the condition-responsive device 13a had an impedance of 4,000 ohms. The fail-safe cell 24 was an ordinary dry cell and had a voltage rating of 1,500 millivolts (1.5 volts), and the resistor 23 had a value of approximately 3.9 megohms. Such an arrangement has a high-speed fail-safe action—contact 21 closed—which takes place in two seconds.

As soon as the measuring circuit is opened as a result of the failure of a transducer or the leads thereto, the relatively high-voltage of the battery 24 is applied by way of the series-resistor 23 to the input circuit of the detector-amplifier 15. Before the opening of the measuring circuit, the fail-safe circuit including battery 24 and resistor 23 is shunted by the relatively low resistance of the measuring circuit and accordingly a substantial part of the voltage of the battery 24 is dissipated, i. e., appears as a potential drop across the high-valued resistor 23.

In accordance with the present invention, resistor 23 while of high value compared with the resistance of the measuring circuit is nevertheless of a value which does not in conjunction with the capacitors 27a and the resistors 27b of the filter 27 introduce a material time delay in the appearance of a fail-safe voltage at the input transformer 29 and at the amplifier 15a. The fail-safe voltage is immediately effective to produce operation of the motor 31 in driving the printwheel assembly 36 to a fail-safe position. The time constant of the R-C circuit including the aforesaid resistors 27b and capacitors 27a is low enough, and the battery voltage high enough, for effective operation of the motor 31 to drive the printwheel assembly 36 the entire width of the chart during a time interval of the order of two seconds. Thus, if a measuring circuit has failed, as soon as the defective circuit is connected to the detector-amplifier 15 by the multi-point switch, the fail-safe circuit 18 is effective to apply to the detector-amplifier a voltage exceeding that introduced by the potentiometer 14 for energization of the motor 31 to drive the mechanism 36 to the edge of the chart 37.

In order to provide the needed speed of operation, the resistance 23 has a value which inescapably produces an undesirable offset in the position of the printwheel assembly 36. In one embodiment of the invention, the offset in terms of the voltage producing it was of the order of 1.54 millivolts which, expressed as a percentage of the 20-millivolt range of the measuring instrument, is an error of 7.7%. An error of that magnitude will prevent the measurements as indicated and/or recorded on the chart 37 from meeting the needed standards of accuracy.

In accordance with the invention, the fail-safe functions are made effective during a fractional part of each measuring cycle. To achieve the needed accuracy of measurement, the fail-safe voltage is made ineffective, or relatively so, during the remaining fraction of each measuring cycle. In the preferred form of the invention as illustrated in Fig. 1, the high-speed fail-safe circuit completed through contact 21 is opened and a fail-safe bias of a low order of magnitude is applied by closure of the circuit through contact 22. In the particular embodiment under discussion the resistor 25 had a value of approximately 15,000 ohms. The resistor 26 had a value of approximately one megohm. The bias or fail-safe voltage across resistor 25 came to approximately 22.5 millivolts.

With the measuring circuit open, this bias voltage is opposed to the potential across the slidewire 34 of the potentiometer 14, and will maintain a signal on the input of amplifier 15 sufficient to keep switch 66 closed. When there is no fault in the measuring circuit, the second fail-safe circuit introduces an offset which expressed as a percentage of the 20 millivolt range is equal to about 0.11 percent. Such an offset is considered inconsequential.

It will be understood that in some arrangements where the indicating and alarm circuits of the fail-safe system may be operated solely by the closure of the switch 66, as when the printwheel assembly 36 is moved into engagement with the arm 67, that the second or low-speed fail-safe system may be dispensed with. As set forth above, the second fail-safe circuit is primarily a holding circuit to assure the operation of the fail-safe alarm in systems where the printing is made during the final balance period and the alarm is to be operated only at that time. If the foregoing be the case, it is to be understood that the first or high-speed fail-safe system will, in accordance with this invention, be disconnected to permit final precise balance of the measuring instruments.

Now that the invention has been described, it will be understood that modifications thereof will be readily apparent to those skilled in the art. For example, the switch 20 may be operated to open and to close the circuit through contact 21 without closure of the circuit through contact 22. A further example of another modification is illustrated in Fig. 2. A fail-safe network 18a, suitable for the practice of the present invention, is comprised of a dry cell 80, which with resistor 81 and switch 83, provides upon initial connection of the measuring circuit, a high rate of fail-safe action. During the initial period of connection, the movable contact 84 of switch 83 is in engagement with fixed contact 85 to connect dry cell 80 and resistor 81 across conductors 16b and 16c. The circuit produces a high rate of fail-safe action. During the terminal portion of the cycle of measurement of the condition, the movable contact 84 of switch 83 moves out of engagement with contact 85, and preferably into engagement with the fixed contact 86 to connect dry cell 80 and resistors 81 and 82 across the measuring circuit. The addition of the resistor 82 reduces the current flow from the dry cell 80 to a negligible value so that the potential difference introduced is greatly reduced, i. e., the flow of such current through the high impedance potential source or measuring circuit as represented by the lines 16a and one of the transducers, is reduced and there is produced a negligible amount of offset error during final balancing of the measuring system.

What is claimed is:

1. A fail-safe arrangement for a measuring system, comprising a source of electromotive force, circuit-changing means for connecting said source in circuit with the input circuit of the measuring system for developing in said input circuit a fail-safe voltage effective to produce high-speed fail-safe operation of the system upon failure of said input circuit, said electromotive force in the absence of failure of said input circuit producing offset in the operation of the measuring system, and means operable in timed relation with the measuring cycle of the measuring system to operate said circuit-changing means greatly to reduce said fail-safe voltage prior to completion of the measuring cycle to eliminate substantially entirely the effect of offset upon the measuring system at the terminal portion of each measuring cycle.

2. A fail-safe system for a self-balancing measuring instrument having a measuring cycle of predetermined length for indicating the magnitude of a condition as detected by a condition-responsive element connected in the input circuit thereof, comprising a high-speed fail-safe circuit including a source of voltage normally connected to said input circuit and normally shunted by the portion of said input circuit including the condition-responsive element to reduce the voltage developed across said input circuit, said fail-safe circuit being effective upon opening of said portion of said input circuit to apply to said measuring instrument a fail-safe voltage of substantial magnitude, switch means connected between said input circuit and said fail-safe circuit closed during the initial measuring period of each measuring cycle of said instrument, and means operable in timed relation with said measuring instrument for opening said switch means to disconnect said fail-safe circuit from said input circuit during the terminal portion of each said measuring cycle of said measuring instrument.

3. In a multi-point measuring system of the type in which a measuring instrument is sequentially connected to each of a plurality of condition-responsive means with a measuring cycle for each of them, a fail-safe arrangement comprising a first source of electromotive force, circuit-changing means for connecting said source in circuit with the input of said system simultaneously with the connection of each of said condition-responsive means for detection of a fault in the condition-responsive means and in the circuit in which it is connected, and a second source of electromotive force having a value much less than the value of said first source of electromotive force, means for operating said circuit-changing means in timed relation with said instrument for disconnecting said first source of electromotive force and for connecting said second source of electromotive force in circuit with each said condition-responsive means prior to completion of each measurement cycle of said instrument.

4. A fail-safe system for a self-balancing measuring instrument having a measuring cycle of predetermined length for measurement of the magnitude of a condition as detected by a condition-responsive element and having a control element positioned in accordance with an output signal which varies with change in the measured magnitudes of said condition, the improvement which comprises a fail-safe network for producing a fail-safe signal of like character as said output signal, and means for applying to said system said fail-safe signal having a magnitude adequate, upon failure of said condition-responsive element, for causing adjustment of said control element to a limit of movement during a fraction of said measuring cycle, said means being operative to remove or to reduce to a negligibly low value said fail-safe signal during the remainder of said cycle to permit accurate measurement of said output signal.

5. The fail-safe system of claim 4 in which said fail-safe signal-applying means includes a voltage divider which develops a small fraction of said fail-safe signal during said remainder of said period as compared with the magnitude of said fail-safe signal applied during the initial portion of said measuring cycle.

6. In a multi-point measuring and control system of the type in which the output signals of a plurality of condition-responsive elements are sequentially applied to the system for measurement of the magnitude of the conditions to which said elements are responsive, and in which the system is adapted to control the positioning of control means in accordance with the measured magnitudes, the improvement which comprises a fail-safe network for producing two fail-safe signals of like character as said output signals, and circuit controlling means for applying to said system a first of said fail-safe signals having a magnitude adequate, upon failure of said connected condition-responsive element, for causing adjustment of said control means to a limit of movement during a fraction of the period that each said condition-responsive elements is connected to said system, said circuit controlling means being operative to apply the other of said fail-safe signals to said system during the remainder of said period to maintain said control means in said limit position.

7. A measuring system including a condition-responsive element, a self-balancing measuring instrument responsive to potentials from said condition-responsive element, a network in circuit with said element, said network including a switch having a movable contact and at least two fixed contacts, an impedance element connected in circuit between one side of said condition-responsive element and said movable contact, a source of voltage connected in circuit between the other side of said condition-responsive element and a first of said fixed contacts, and a voltage divider connected across said source of voltage, the other of said fixed contacts being connected to a tap on said voltage divider, said switch being operable during the time said condition-responsive element is connected to said measuring instrument for effecting connection first between said movable and said first contact then between said movable and said other contact to provide initially a high-speed fail-safe action with high offset and then a low-speed fail-safe action during the actual balance of said system with a negligible amount of offset.

8. In a multi-point measuring system including a self-balancing measuring instrument having an input circuit, and a plurality of condition-responsive elements for sequential connection to said input circuit of said instrument, the improvement which comprises a fail-safe network for connection in circuit sequentially with the condition-responsive elements during a portion of the time each element is connected to said input circuit, said network comprising a pair of impedances in series circuit with a source of potential, means for effecting insertion of one of said impedances and said source in circuit with each of said condition-responsive elements during the initial part of the time interval said elements are individually connected to said instrument for providing high-speed fail-safe action for said system, said one of said impedances having a value which provides fail-safe operation of said system during said initial part of said time interval, and means for adding the other of said impedances to said one impedance and said source and in circuit with each of said elements while they are individually connected to said measuring instrument and during the terminal portion of said time interval thereby reducing offset during final balance of said measuring system.

9. A measuring system including a condition-responsive element, a self-balancing measuring instrument having capacitance in its input and responsive to unbalance potentials produced by said condition-responsive element, a fail-safe network in circuit with said element, said network including a switch having a movable contact and at least two fixed contacts, a resistor connected from one side of said condition-responsive element to said movable contact, a source of electromotive force connected between the other side of said condition-responsive element and a first of said fixed contacts, a voltage divider connected across said source of electromotive force, the other of said fixed contacts being connected to a tap on said voltage divider, said movable contact being movable during measurement by said system to provide upon contact with said first of said fixed contacts a first fail-safe circuit in circuit with said condition-responsive element, said resistor having a value which with said input capacitance provides negligible time delay in said system to provide for high-speed fail-safe action, said movable contact being further movable to contact the other of said fixed contacts to provide a second fail-safe network and to present to the input of said instrument a negligible amount of offset signal during actual measurement of the potential produced by said condition-responsive element.

References Cited in the file of this patent

UNITED STATES PATENTS 2,404,891    Schmitt _____ July 30, 1946